US 8,817,826 B2

United States Patent
Isley

(10) Patent No.: US 8,817,826 B2
(45) Date of Patent: Aug. 26, 2014

(54) AGGREGATING LOWER BANDWIDTH ASYNCHRONOUSLY CLOCKED COMMUNICATION LINKS INTO A HIGHER BANDWIDTH LINK

(75) Inventor: Kenneth Isley, Fogelsville, PA (US)

(73) Assignee: LSI Corporation, San Jose, CA (US)

( * ) Notice: Subject to any disclaimer, the term of this patent is extended or adjusted under 35 U.S.C. 154(b) by 1008 days.

(21) Appl. No.: 12/474,729

(22) Filed: May 29, 2009

(65) Prior Publication Data

US 2010/0303128 A1 Dec. 2, 2010

(51) Int. Cl.
*H04J 3/02* (2006.01)
*H04L 12/54* (2013.01)
*H04L 12/70* (2013.01)

(52) U.S. Cl.
CPC ..... *H04L 12/5601* (2013.01); *H04L 2012/5676* (2013.01); *H04L 2012/5607* (2013.01)
USPC .......................................................... 370/538

(58) Field of Classification Search
USPC .......... 370/357, 441, 479, 480, 534, 538, 540
See application file for complete search history.

(56) References Cited

U.S. PATENT DOCUMENTS

| | | | |
|---|---|---|---|
| 5,504,774 A * | 4/1996 | Takai et al. | 375/134 |
| 6,510,229 B1 | 1/2003 | Geile | |
| 6,584,080 B1 * | 6/2003 | Ganz et al. | 370/315 |
| 6,804,193 B1 * | 10/2004 | Dubreuil | 370/217 |
| 7,050,419 B2 * | 5/2006 | Azenkot et al. | 370/347 |
| 7,058,063 B1 * | 6/2006 | Cavendish | 370/395.41 |
| 2002/0150046 A1 | 10/2002 | Dubuc | |
| 2002/0176367 A1 * | 11/2002 | Gross | 370/252 |
| 2003/0152076 A1 | 8/2003 | Lee et al. | |
| 2003/0169756 A1 * | 9/2003 | Scholten | 370/412 |
| 2004/0136385 A1 * | 7/2004 | Xue et al. | 370/401 |
| 2004/0233846 A1 * | 11/2004 | Khandani et al. | 370/235 |
| 2004/0246977 A1 | 12/2004 | Dove et al. | |
| 2005/0286529 A1 | 12/2005 | Arulambalam et al. | |
| 2010/0135368 A1 | 6/2010 | Mehta et al. | |

* cited by examiner

*Primary Examiner* — Wanda Z Russell
(74) *Attorney, Agent, or Firm* — Ryan, Mason & Lewis, LLP

(57) ABSTRACT

A spread spectrum generator module is configured to provide data for spreading frequency spectra of at least first and second lower bandwidth asynchronously clocked communication links. A packet scheduling module aggregates the two (or more) lower bandwidth links into a higher bandwidth link or interface. The frequency spectra of the lower bandwidth links are spread in accordance with the data for spreading the frequency spectra. A downstream disaggregation element filters high frequency noise resulting from the spreading of the spectra.

20 Claims, 12 Drawing Sheets

AGGREGATING LOWER BANDWIDTH ASYNCHRONOUSLY CLOCKED COMMUNICATION LINKS INTO A HIGHER BANDWIDTH LINK

FIELD OF THE INVENTION

The present invention relates generally to the electrical and electronic arts, and more particularly relates to communications networks.

BACKGROUND OF THE INVENTION

The aggregation of two (or more) lower bandwidth asynchronously clocked communication links into a higher bandwidth link is required in many situations. Non-limiting examples of lower bandwidth asynchronously clocked packetized communication links include AAL1 UDT (Asynchronous Transfer Mode Adaptation Layer Type 1 User Datagram Protocol Data Transfer Protocol) or PWE3 SAToP (Pseudowire Emulation Edge-To-Edge Working Group Structure-Agnostic Time-Division Multiplexing over Packet) links being carried via a gigabit Ethernet (IEEE 802.3) or other high speed serial data connection.

In such situations, the asynchronous nature of the arriving packets creates periodic congestion on the higher bandwidth link when the lower bandwidth links all attempt to transmit their packets through the higher bandwidth link at exactly the same instant. The periodic congestion occurs at a beat frequency of $F_{beat}=F_0-F_1$ where $F_0$ and $F_1$ are the packet frequencies of the lower bandwidth links. This periodic congestion at frequency $F_{beat}$ is low frequency noise which is difficult to filter out in the buffer adaptive clock recovery circuits.

SUMMARY OF THE INVENTION

Aspects of the invention provide, in illustrative embodiments thereof, techniques for aggregating lower bandwidth asynchronously clocked communication links into a higher bandwidth link.

In accordance with one aspect of the invention, an apparatus includes a spread spectrum generator module configured to provide data for spreading frequency spectra of at least first and second lower bandwidth asynchronously clocked communication links (which may be packetized links). The apparatus also includes a packet scheduling module (in some embodiments, a packet construction and scheduling module) configured to aggregate the two (or more) lower bandwidth links into a higher bandwidth link or interface. The frequency spectra of the lower bandwidth links are spread in accordance with the data for spreading the frequency spectra. A downstream disaggregation element filters high frequency noise resulting from the spreading of the spectra.

In accordance with another aspect of the invention, an exemplary method includes spreading frequency spectra of two (or more) lower bandwidth asynchronously clocked communication links (which may be packetized links). The method also includes subsequently aggregating the two (or more) lower bandwidth asynchronously clocked communication links into one higher bandwidth link or interface, using multiplexing equipment. In some cases, a further step includes filtering high frequency noise, resulting from the spreading of the spectra, when disaggregating the higher bandwidth link or interface to recover the two (or more) lower bandwidth links.

These and other features and advantages of the invention will become apparent from the following detailed description of illustrative embodiments thereof, which is to be read in connection with the accompanying drawings.

DETAILED DESCRIPTION OF THE INVENTION

As noted, the aggregation of two (or more) lower bandwidth asynchronously clocked communication links into a higher bandwidth link is of interest in certain situations. Examples of lower bandwidth asynchronously clocked packetized communication links include AAL1 UDT (Asynchronous Transfer Mode Adaptation Layer Type 1 User Datagram Protocol Data Transfer Protocol) or PWE3 SAToP (Pseudowire Emulation Edge-To-Edge Working Group Structure-Agnostic Time-Division Multiplexing over Packet) links being carried via a gigabit Ethernet connection.

In such situations, the asynchronous nature of the arriving packets creates periodic congestion on the higher bandwidth link when the lower bandwidth links all attempt to transmit their packets through the higher bandwidth link at exactly the same instant. The periodic congestion occurs at a beat frequency of $F_{beat}=F_0-F_1$ where $F_0$ and $F_1$ are the packet frequencies of the lower bandwidth links. This periodic congestion at frequency $F_{beat}$ is low frequency noise which is difficult to filter out in the buffer adaptive clock recovery circuits.

It should be noted that in many cases, the two (or more) lower bandwidth links are lower speed links and the higher bandwidth link is a higher speed link. However, in some instances of the invention, the two (or more) lower bandwidth links are aggregated into a higher bandwidth link of identical speed instead of higher speed. This latter case (same speed) is possible so long as the link into which the other links are being aggregated has extra bandwidth. For example, two DS 1 1.5 Mbps links cannot be aggregated into another DS 1 1.5 Mbps link; however, in a packet-based scenario, wherein the input links were not 100 percent utilized, the aggregation of links into a link of identical speed (but higher bandwidth) is feasible.

Figure 1:
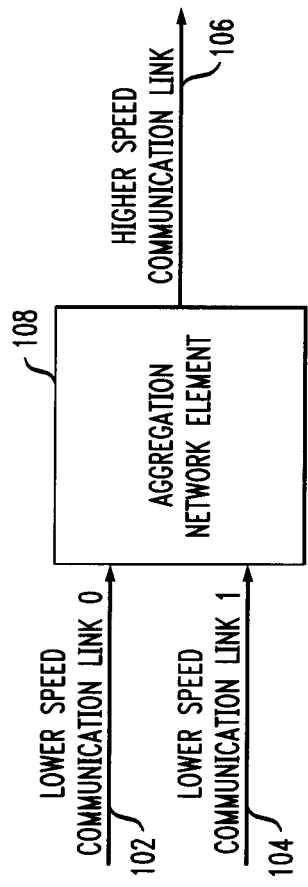
FIG. 1 is a block diagram depicting an exemplary aggregation network element, according to an aspect of the invention.

With reference to FIG. 1, one or more embodiments of the invention employ a scheduler to spread the frequency spectra ($F_0, F_1, \ldots$) for each of the lower bandwidth communication links 102, 104, so that the repeated periodic congestion on the higher bandwidth link 106 can be avoided, and the low frequency noise can be replaced with higher frequency noise which can successfully be filtered. In one or more instances of the invention, this results in improved performance of the buffer adaptive clock recovery circuits (for example, in block 810 to be discussed below). Furthermore, in one or more embodiments, aggregation points downstream from the scheduler will also benefit from the spread spectrum scheduler, allowing utilization of legacy switching equipment. The scheduler can be located, for example, within an aggregation network element 108.

One or more embodiments of the invention address buffer adaptive clock wander due to the aggregation of multiple asynchronous channels, such as 102, 104 (in general, there may be two or more channels being aggregated, numbered 0 to N, where N is an integer having a value greater than or equal to one). Aspects of the invention employ a statistical scheduler (as opposed to a fixed scheduler, or no scheduler), advantageously permitting a solution for all aggregation points in a network, and avoiding the need for an equipment upgrade to all such aggregation points.

As used herein, "wander" is a low frequency phase shift in the signal below 10 Hz, or lasting longer than one second. The reason correct wander performance is important in one or more telecommunications applications is that the standardized legacy equipment installed throughout the telephone network has only limited amounts of data buffers which can compensate for wander. If wander is excessive, then the data buffers will either underflow, or overflow depending on the direction of the wander. The over- and/or under-flow will then result in frame slips, or loss of framing, causing a loss of data. To avoid loss of data in the network, wander must remain below acceptable thresholds.

Buffer Adaptive Clock Recovery can be used when the original clock used to transmit data is not available at the receiving end. To avoid loss of data in a network, data rate at the transmitting and receiving ends should match. Otherwise, wander can occur, resulting in a possible loss of data. One technique for generating the correct clock at the receiving end is to examine the timing characteristics of the arriving data, and using those characteristics to re-generate, or recover, a clock with a frequency very similar to the original clock. In a packet based network such as PWE3 the clock recovery circuit can utilize the frequency and phase relationships of the arriving packets along with other information such as the fill level of the delay buffers as inputs to a clock recovery circuit such as a phase locked loop.

As used herein, a "channel" refers generally to a logical channel (e.g., individual digital signal 0 (DS0) channels which go into making a DS1, individual DS1 signals which go into making a DS3), which may be carried over any physical medium, such as a wireless communication link (for example, cellular, radio frequency (RF), infrared (IR), microwave, satellite, etc.), and may also include a dedicated communication line, such as, for example, telephone, cable, copper, fiber optic, etc. A channel may have a certain data rate associated therewith. Lower rate channels can be aggregated into a single higher rate channel by using, for example, multiplexers, as will be understood by those skilled in the art. Likewise, lower rate channels can be extracted from a higher rate channel by using, for example, de-multiplexers. A single physical link may carry a number of logical channels. A lower bandwidth link in the illustrative embodiments may be, by way of a non-limiting example, a digital signal 1 (DS1) link comprising 24 DS0 channels and having a data rate of 1.544 megabits per second (Mbps), or an E1 link comprising 32 DS0 channels and having a data rate of 2.048 Mbps. Examples in this paragraph are presented to assist the understanding of the skilled artisan and are not intended to limit the scope of the invention.

Figure 3:
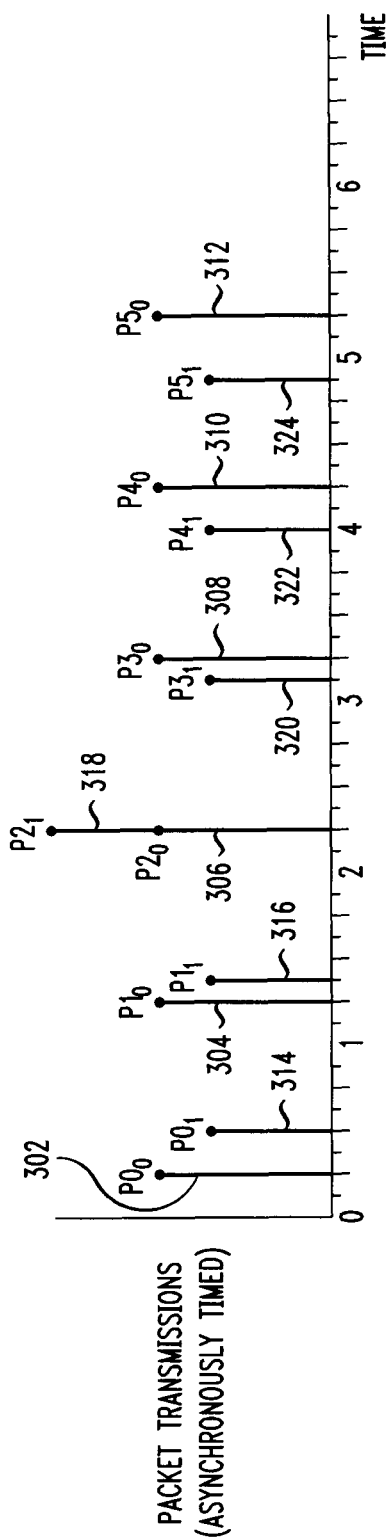
FIG. 3 depicts asynchronously timed low bandwidth links creating packets or cells, with the frequency offsets between the two lower bandwidth communication links exaggerated for illustrative clarity.
Figure 5:
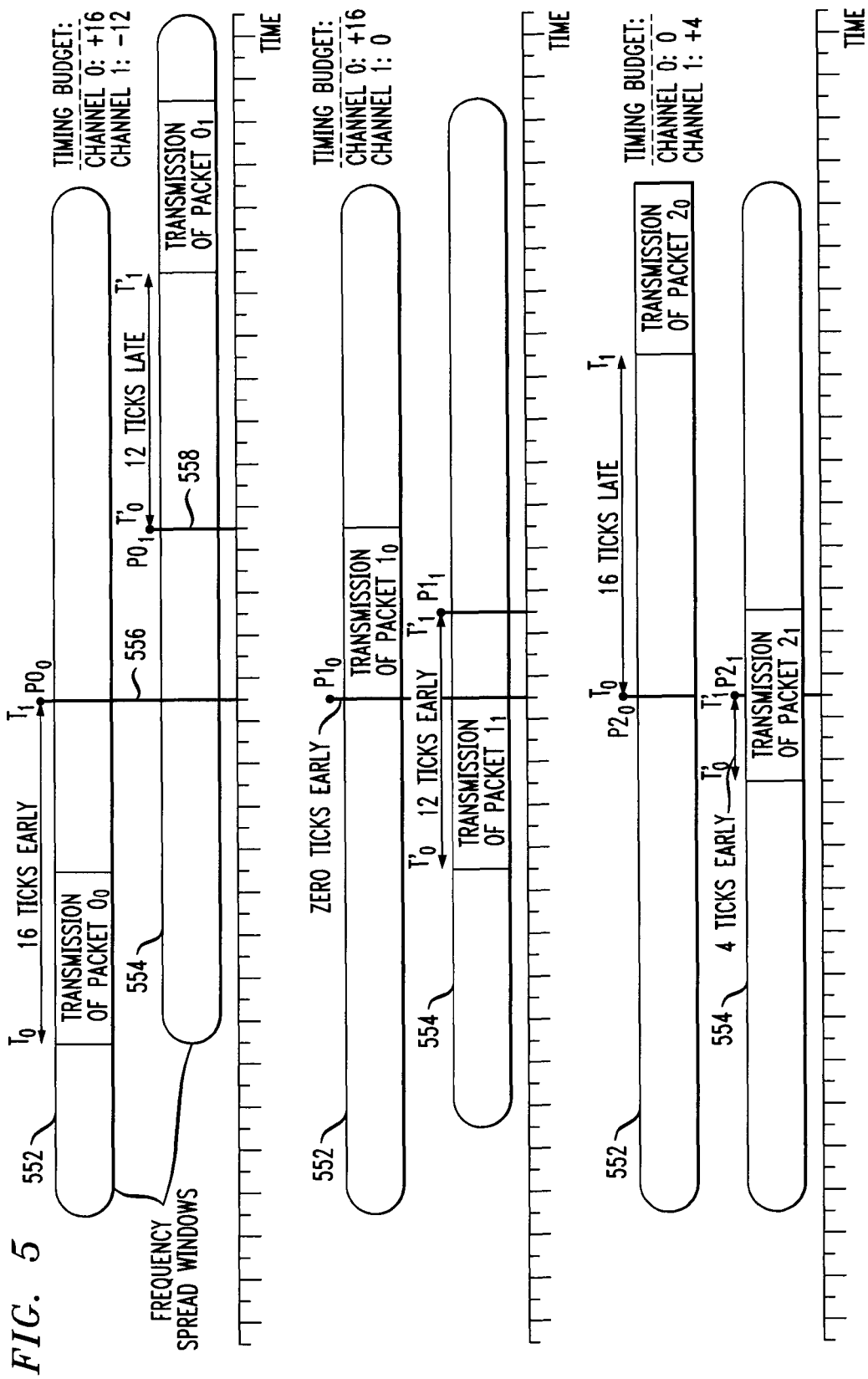
FIG. 5 depicts an example of a spread-spectrum scheduler creating frequency windows centered on the ideal cell or packet creation or transmission time, according to another aspect of the invention, with the frequency windows exaggerated for illustrative clarity.
Figure 5:
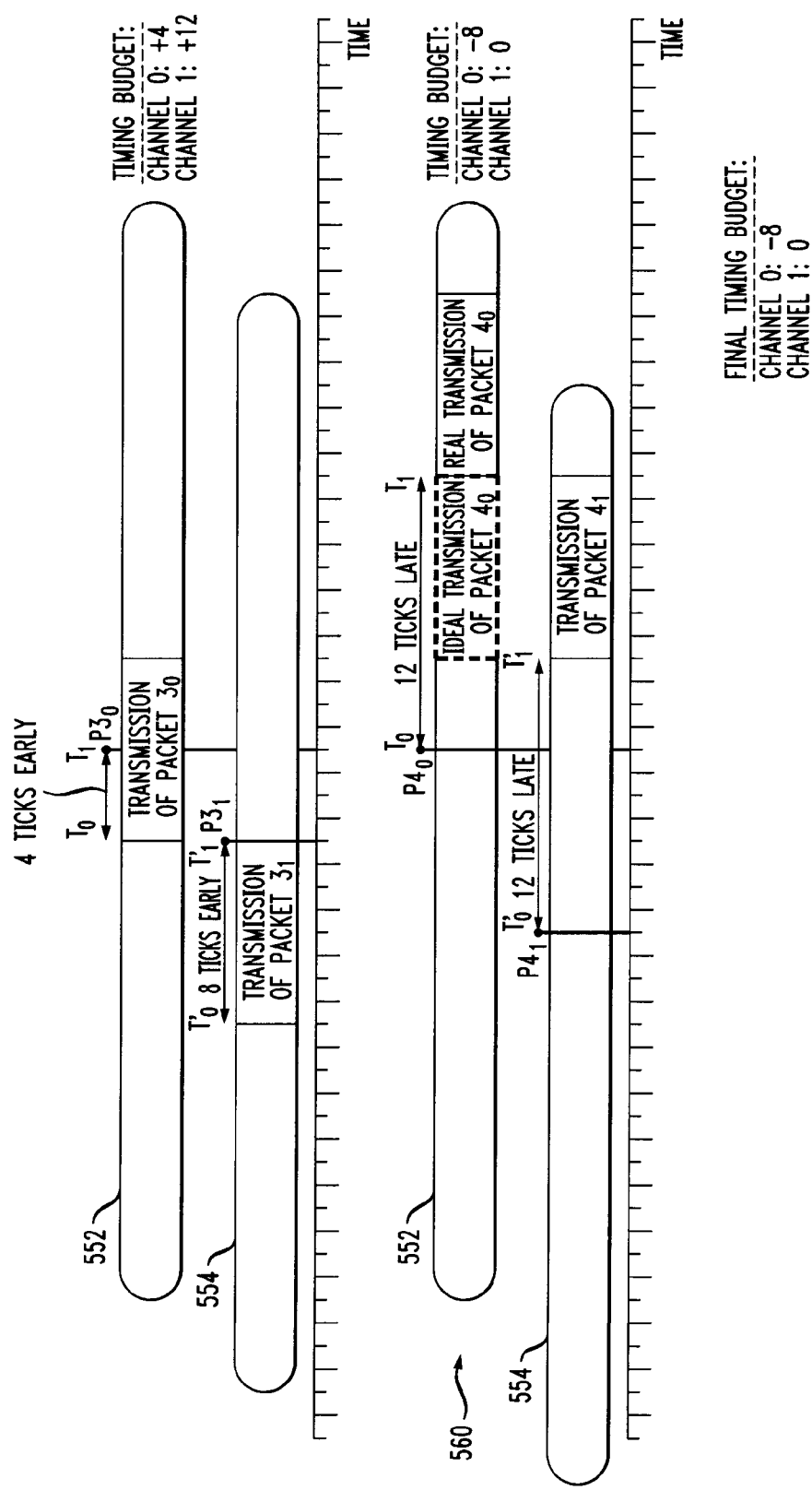

One or more embodiments of a scheduler, according to one or more aspects of the invention, utilize a frequency spreading function to prevent repeating periodic congestion in the aggregation of multiple communication channels, which may be packetized. In one or more instances, when implemented at the edge of a network, the benefit just described extends throughout the entire communication network, improving the performance of buffer adaptive clock recovery circuits for asynchronously timed communication links. With respect to frequency spreading, in one or more embodiments of the invention, the tall and narrow spectra as seen in FIG. 3 are spread out (shortened and widened) as shown in FIG. 5. This reduces the chance of congestion, as at point 318 in FIG. 3, to be discussed further below. In the context of frequency spreading, it is instructive to recognize that it is relatively easy, through filtering, to isolate a relatively narrow (frequency) spectrum desired signal from a noisy background, but quite difficult to separate two narrow (frequency) spectrum signals which are close to each other in frequency. With respect to packetized communication channels, as used herein, a "packet" is intended to cover any logically grouped set or subset of bits which are carried together through a communication network.

Aspects of the invention relate to the scheduling for transmission of telecommunication packets of data for multiple lower bandwidth asynchronously timed communication links 102, 104, for aggregation into a higher bandwidth link or interface 106. Links have been discussed above. An interface may be distinguished from a link in that an interface refers to a transformation between logical blocks in the same general "box" (for example, an on-chip communication between different blocks on the chip or a communication between different chips in a module or on a board). Non-limiting examples of such lower bandwidth links include T1 or E1 lines (digital signal 1 signaling scheme generally known as T1 in North America, Japan and South Korea and E1 elsewhere). Non-limiting examples of such higher bandwidth links include UTOPIA (asynchronous transfer mode (ATM) protocol specification that eventually evolved into the System Packet Interface), SPI-3 (System Packet Interface level 3), or Ethernet. A non-limiting example of an interface would be a case of aggregating ATM cells and then transforming them into Pseudo-Wire or Internet protocol (IP) packets.

Figure 2:
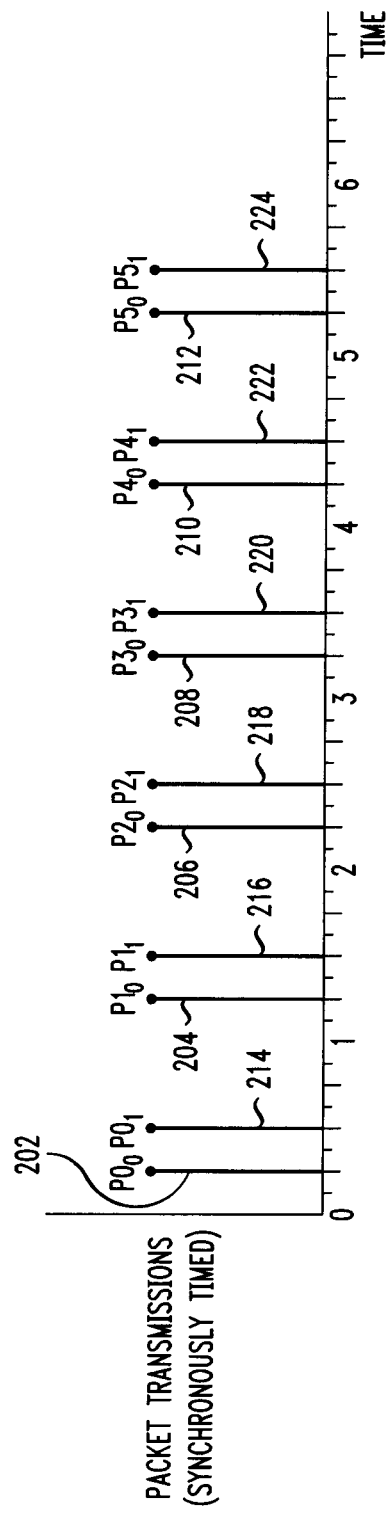
FIG. 2 depicts the fixed nature of synchronously timed low bandwidth links creating packets or cells.

When multiple lower bandwidth communication links are aggregated onto a higher bandwidth link in a cell or packet format such as ATM AAL1 or Pseudo-Wire End-to-End Emulation (PWE3), the cells or packets containing the data from the lower bandwidth links are typically scheduled in some fashion, since the higher bandwidth link is unable to transmit more than a single packet or cell at any given instant in time. A simple form of scheduling is a first come, first served technique. When all lower bandwidth links are synchronous, with each link operating at exactly the same speed (such as a synchronous AAL1 communication channel or channels or other synchronous logical communication channel(s) sending out packets (for example, pseudo-wire)), a fixed period scheduler can be used, which allocates a fair share of the bandwidth on the higher bandwidth link for the orderly transmission of all the cells or packets from the lower bandwidth links. Since the clocks of the lower bandwidth links are all locked to each other, there is no drift in the cell or packet creation times, and the scheduler can ensure that there is never any congestion between packets or cells flowing into the higher bandwidth link. FIG. 2 shows the fixed nature of synchronously timed low bandwidth links creating packets or cells. In particular, the horizontal axis is a time axis; locations 202, 204, 206, 208, 210, 212 show first through sixth packets associated with low bandwidth link zero; and locations 214, 216, 218, 220, 222, 224 show first through sixth packets associated with low bandwidth link one.

With reference to FIG. 3, when the lower bandwidth links are asynchronously timed, as in the case of AAL1 UDT or PWE3 SAToP, where each channel operates at a unique but similar frequency, then the creation of the packets is not evenly spaced, since the multiple lower bandwidth links are all operating at slightly different frequencies ($F_0, F_1, \ldots F_n$). When the frequencies of two or more links are different, then a beat-frequency of $F_{beat}=F_0-F_1$ will appear. On each beat of this beat-frequency, the cell or packet sending (in the case of an interface) or transmission (in the case of a link) times will line up exactly which will result in congestion or competition between the cells or packets as they both require transmission on the higher bandwidth line at the same instant. Note that, in FIG. 3 as in FIG. 2, the horizontal axis is a time axis; locations 302, 304, 306, 308, 310, 312 show first through sixth packets associated with low bandwidth link zero; and locations 314, 316, 318, 320, 322, 324 show first through sixth packets associated with low bandwidth link one. Shortly after time "2" on the horizontal axis, the third packets $P2_0$, $P2_1$ (reference characters 306, 318, respectively) for both lower bandwidth links require transmission at the same time. This is an example of the type of congestion experienced.

Note that in the example of FIG. 3, the frequency offset between the two lower bandwidth communication links 102, 104 is highly exaggerated to illustrate the above points. Furthermore, closer examination of the congestion period experienced shows that all links will suffer a delay between their ideal transmission time, and their actual transmission time; first one link, then the other (note that link zero "passes" link 1 to the right of the point of interference between packets 306, 318). The magnitude of the delay for any single cell or packet is proportional to the size of the cells or packets used, and to the bandwidth of the higher bandwidth link 106. The duration and cumulative number of cells or packets delayed is inversely proportional to the beat frequency $F_{beat}$.

Figure 4:
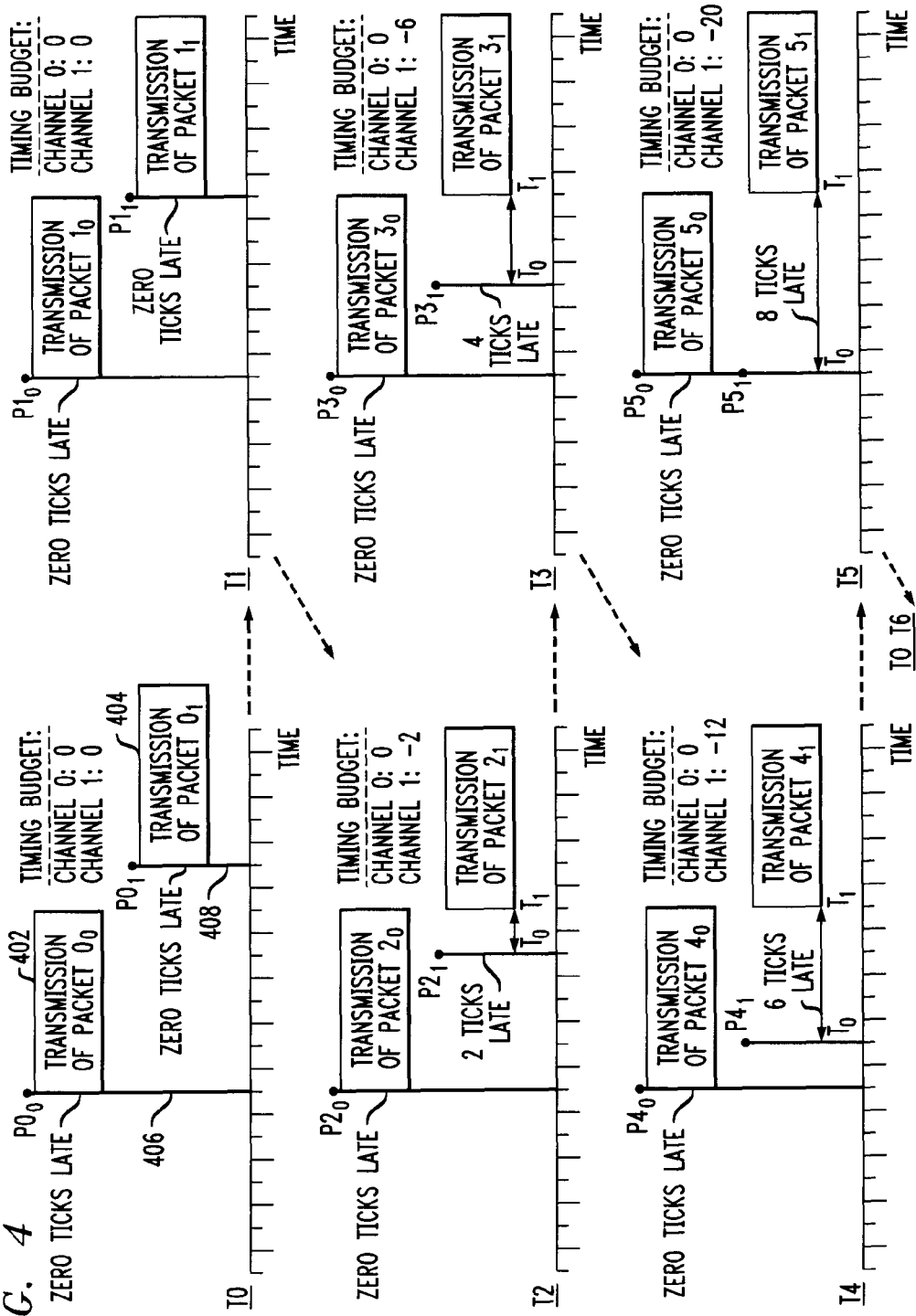
FIG. 4 depicts, for illustrative purposes, a detailed example of delays experienced by the links suffering from congestion due to the beat-frequency effect, with the frequency offset transmission windows and overlaps exaggerated for illustrative clarity.
Figure 4:
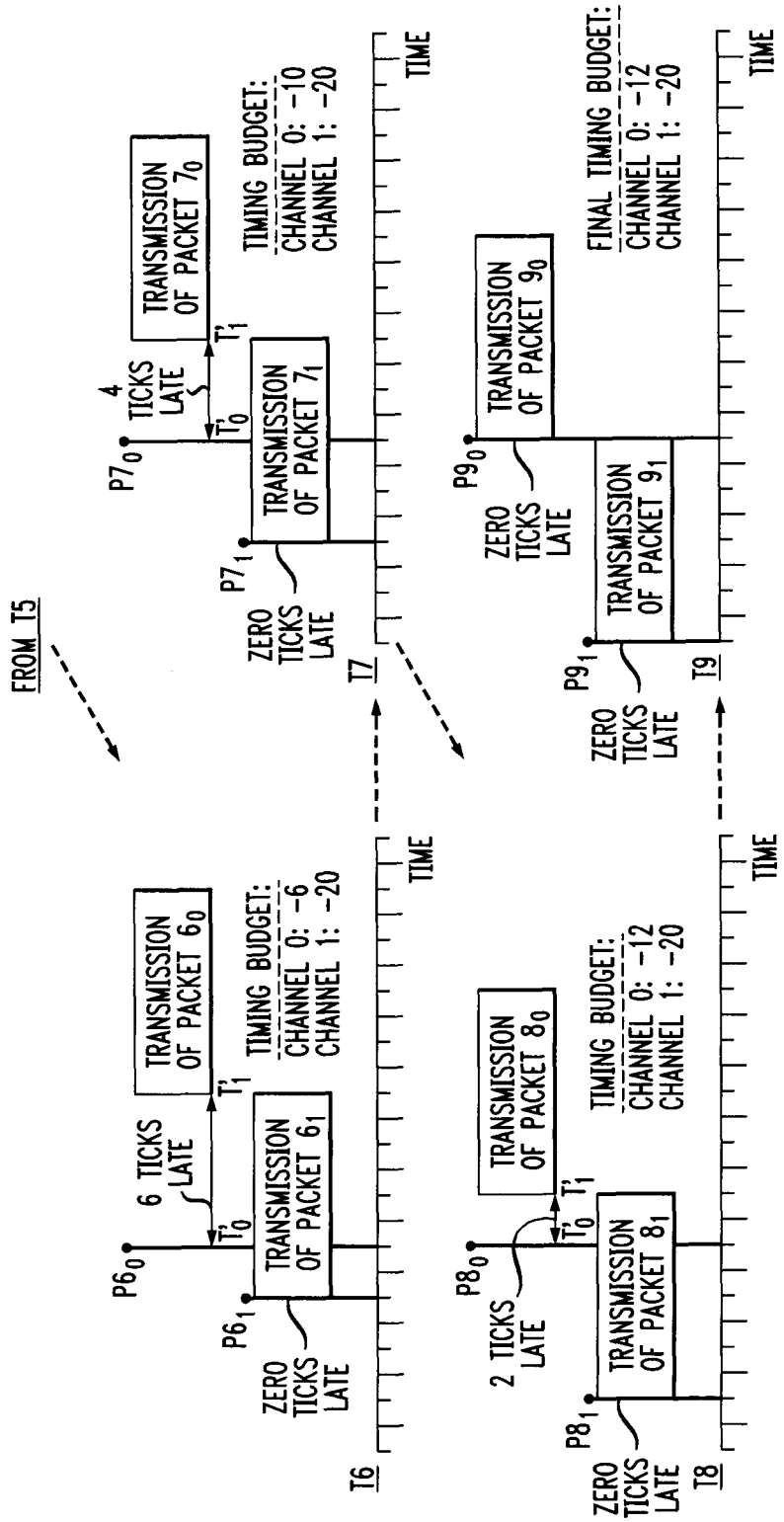

In the more detailed example of FIG. 4, the delays experienced by the links suffering from congestion due to the beat-frequency effect are illustrated. As the ideal packet creation times for link one ($P0_1$ thru $P9_1$) sweep past the ideal packet creations times for link zero ($P0_0$ thru $P9_0$), first link one, then link zero suffers from delays in the transmission of packets.

The example of FIG. 4 lasts for ten cells or packets associated with times numbered T0 through T9. In the example:

Three of the cells or packets for link zero are delayed, as seen at times T6, T7, and T8, with an average delay of four ticks per packet (calculated as 12 ticks/3 packets).

Four of the cells or packets for link one are delayed, as seen at times T2, T3, T4, and T5 with an average delay of 5 ticks per packet (calculated as 20 ticks/4 packets).

Since the two frequencies (i.e., of the links 0 and 1) are not exactly the same, there will be times when both logical links "want" to send a packet at the same time. Furthermore, since the packets have a certain length, it takes some time to send them. The elapsed time required to actually send a packet is represented by the "flags" 402, 404, with the desired commencement of transmission (or sending to an interface, as the case may be) indicated by the "flagpoles" 406, 408. Upon reaching T2, the "flag" for $P2_0$ overlaps the "flagpole" for $P2_1$, thus resulting in delay on channel 1 as shown (Packet $P2_1$ cannot be sent until the trailing edge of the "flag" for packet $P2_0$). The delay worsens through T5, where channel 1 must wait the entire transmission time for the packet on channel 0. Then, the situation reverses as shown at T6, and now, the "flag" for $P6_1$ overlaps the "flagpole" for $P6_0$, thus resulting in delay on channel 0 as shown. The delay of channel 0 gradually is reduced until T9, when neither channel is delayed. The cumulative delay is 12 time units for channel 0 and 20 time units for channel 1.

The delays, in the time domain, result in delay from the ideal transmission time to the actual transmission time, while in the frequency domain, an apparent frequency shift in the signal would be observed. The timing information carried in the signal is "thrown off" due to this frequency-domain phenomenon. It is desired to recover the frequency at which the original circuit operated—in FIG. 8, to be discussed further below, links 802 and 804 each operate at some frequency. This process is known at clock recovery. When the link 808 is subsequently de-multiplexed at 810, both the information in the links 802, 804 and the frequency of the links 802, 804 should be recoverable, so that the links 802, 804 can be accurately recreated as 812, 814, in terms of both the values of individual bits and the spacing there-between. If frequency spreading in accordance with embodiments of the invention were not employed, the delay issues shown in FIGS. 3 and 4 would cause difficulty in attempting desired clock recovery in block 810 (for example, using a phase-locked loop (PLL)).

PLLs are typically able to average out occasional frequency variations, using an approach similar to the well-known stock market moving average; however, they are not able to deal well with consecutive repeating errors as shown in FIGS. 3 and 4. In such a case, when a second, close but different frequency is introduced, it is simply subsumed into the moving average. Issues arise due to the fact that the moving average is taken over some fixed time window; if too long, it will not react sufficiently quickly to changes (analogous, for example, to a fifty-two week moving average in the stock market). Conversely, if too short of a window is used, excessive fluctuation in the recovered frequency may occur (analogous to the "churning" in a stock account if a moving average of a market index was taken over a window of a few minutes). Overlap situations such as in T2-T5 of FIG. 4, because the moving average window is of finite length, have the tendency of feeding false information into the "moving average" calculations as to when the (recovered) clock should tick. In sum, the type of phenomenon depicted in FIGS. 3 and 4 is problematic when carrying out clock recovery with a phase-locked loop.

By way of background, a moving average can be used to smooth out short-term fluctuations in a set of time series data points by creating a series of averages of different subsets of the full data set (the subsets might be, for example, samples within a certain time window). A moving average is a type of convolution and is thus similar to a low-pass filter used in signal processing.

Still considering the issues illustrated in FIGS. 3 and 4, in actual applications, such as AAL1 UDT or PWE3 SAToP circuits, the congestion events can last much longer than those depicted. For example, in a two channel AAL1 UDT application with a 1 PPM (parts-per-million) frequency offset between the two channels, the congestion period can last 3.9 seconds, and have an impact on 21,000 consecutive cells. For synchronously timed applications with a fixed, local clock, this is not an issue. However, when performing buffer adaptive clock recovery, this low frequency, long lasting distortion or noise is difficult or impossible to filter out and can cause unacceptable wander in the recovered clock.

The congestion-induced wander in buffer adaptively recovered clocks, due to the beat-frequency phenomena present when multiple asynchronous low bandwidth links are packetized and aggregated onto a higher bandwidth link, is an area of concern for telecommunication carriers and equipment manufacturers as networks are modernized with new abilities such as PWE3. When present in aggregation equipment (such as equipment 904 in FIG. 9 to be discussed further below) on the edge of the network (for example, network 902 in FIG. 9 to be discussed further below), one or more embodiments of a spread-spectrum scheduler, according to aspects of the invention, are able to provide a frequency window for the transmission of asynchronously timed packets or cells, which reduces the probability that repeated, long lasting congestion between two links will occur. In one or more instances of the invention, the low-frequency, long lasting, difficult to filter noise or distortion is transformed into high frequency noise which can be filtered easily with existing PLL or DPLL (phase-locked loop or digital phase-locked loop) clock recovery circuits. Additionally, since the spread-spectrum nature of the cell or packet transmission extends into the network, not only will the equipment on the edge of the network benefit from reduced congestion between the asynchronously-timed links, but existing switches and equipment inside the network will also benefit and will have a lower probability of becoming a congestion point for the asynchronously timed circuits.

FIG. 5 shows an example of frequency windows created by a spread-spectrum scheduler, according to an aspect of the invention. The scheduler creates frequency windows 552, 554 centered about the nominal cell or packet sending or transmission times 556, 558, for link zero and link one, respectively. Both (i) consecutive cells delayed and (ii) average delay per cell are greatly reduced, which improves the wander performance of the recovered clock circuits. The tall impulses or spikes of FIG. 3 are spread and now the packet can probabilistically be sent at any time within the spread frequency window. FIG. 5 is shown in the time domain. Instead of the "flagpoles" and "flags" of FIG. 4, the "flags" are spread out into the frequency windows 552, 554, wherein transmission may be early, late, or on time, within the given window 552, 554. Preferably, the statistical probability of being "early" within one of the windows 552, 554 is equal to the probability of being "late." The effects of the deliberate spreading within the windows 552, 554 can be calculated and neutralized, such that it is possible to nearly perfectly recover the locations of the flagpoles (i.e., carry out clock recovery) with the PLL, as the PLL will average out the variations within the windows.

Using the windows 552, 554 greatly reduces the probability that any two channels will try to send out a packet at exactly the same time twice in a row (that is, for any significant amount of time, "significant" meaning in this context an amount of time which would hinder clock recovery). There is of course some small probability of occasional collisions, such as at the bottom portion 560 of FIG. 5. The timing budgets up to the last example 560 in FIG. 5 arise simply due to the probabilistic frequency spreading. The windows 552, 554 in the time domain correspond to a frequency spreading in the frequency domain, and can be carried out by spread spectrum generator 610 discussed further just below.

Figure 6:
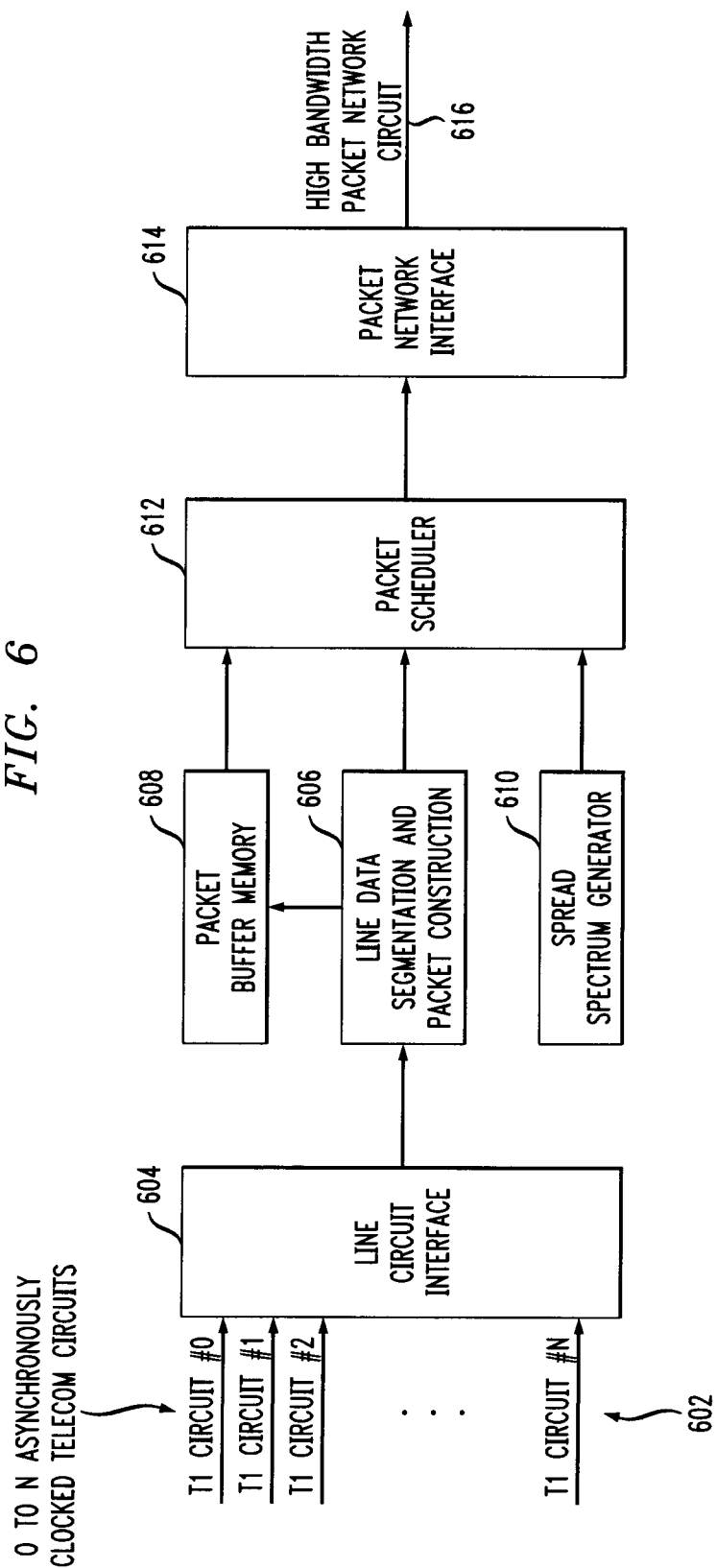
FIG. 6 is an exemplary telecommunications aggregation (multiplexing) device block diagram, according to yet another aspect of the invention.

FIG. 6 is an exemplary telecommunications aggregation (multiplexing) device block diagram, according to an aspect of the invention. At least two asynchronously clocked telecommunications circuits 602, numbered 0 through N, are input to a line circuit interface 604. The line data is segmented, and packets are constructed, in line data segmentation and packet construction block 606. The constructed packets are loaded into packet buffer memory 608. Transmission of the packets is scheduled by packet scheduler 612, and is carried out by packet network interface 614, resulting in aggregation of links 602 into high bandwidth packet network circuit 616. Packet scheduler 612 receives input from spread spectrum generator block 610, to probabilistically spread the transmission of packets within windows such as 552, 554 in FIG. 5. One preferred but non-limiting exemplary implementation of spread spectrum generator 610 is a pseudo random number generator with a calculable balance point. A pseudo-random bit sequence (PRBS) is generated to obtain a repeating bit pattern of finite length. The PRBS is evenly distributed and is tapped such that ½ of the numbers yield early transmission of the packet relative to nominal points 556, 558 and ½ of the numbers yield late transmission relative to nominal points 556, 558. Generator 610 may be implemented entirely in hardware (e.g., as an ASIC or a portion thereof) or in software or firmware embodied in a tangible computer-readable recordable storage medium running on hardware such as a general purpose processor. In other embodiments, a true random number generator is employed and a true random bit sequence is tapped.

Figure 7:
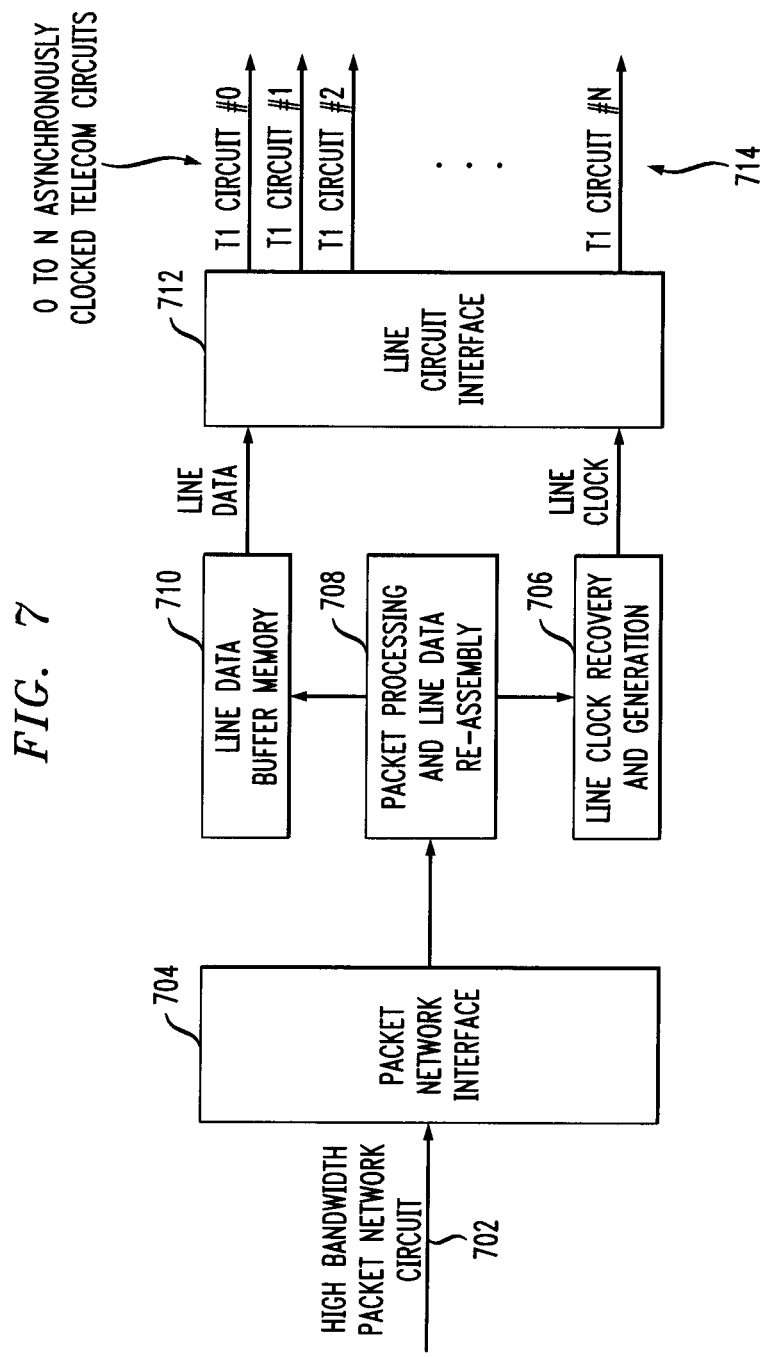
FIG. 7 is an exemplary telecommunications de-aggregation (disaggregation or de-multiplexing) device block diagram, according to still another aspect of the invention.

FIG. 7 is an exemplary telecommunications de-aggregation (disaggregation or de-multiplexing) device block diagram, according to an aspect of the invention. High bandwidth packet network circuit 702 (which could be, for example, circuit 616) is input to packet network interface 704, which then sends the packets to block 708 for packet processing and line data reassembly. Line data is output from block 708 into buffer 710 and then sent to line circuit interface 712 for de-aggregation into two or more asynchronously clocked telecommunications circuits 714, numbered 0 through N, which are, for example, re-creations of links 602. Interface 712 is clocked by line clock recovery and generation block 706, which recovers the line clock for the links to be de-aggregated based on input from block 708. Block 706 may employ, for example, a PLL as discussed elsewhere herein.

Figure 8:
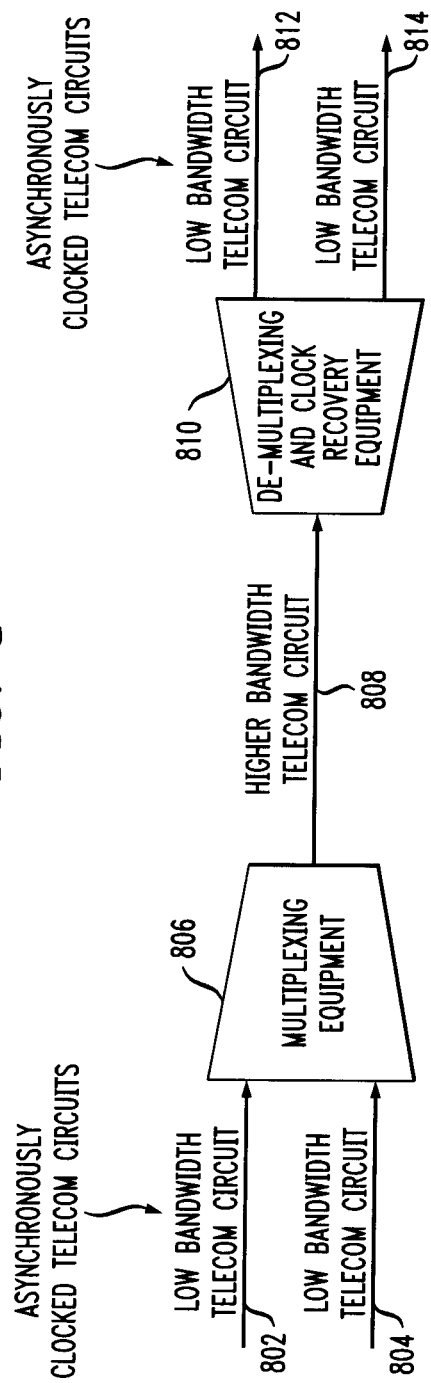
FIG. 8 depicts a first non-limiting exemplary telecommunications network, in which one or more techniques of the invention may be employed.

FIG. 8 depicts one non-limiting exemplary telecommunications network, in which one or more techniques of the invention may be employed. Two or more asynchronously clocked low bandwidth telecommunication circuits 802, 804 are input into multiplexing equipment 806 (which uses frequency spreading techniques as described elsewhere herein) and which aggregates links 802, 804, into higher bandwidth telecommunications circuit 808. Link 808 is subsequently input into de-multiplexing and clock recovery equipment 810 and link 808 is de-multiplexed into low bandwidth asynchronously clocked telecommunications circuits 812, 814 (for example, as described in regard to FIG. 7). In one or more instances of the invention, frequency spreading in accordance with aspects of the invention results in improved performance of the buffer adaptive clock recovery circuits (for example, in block 810). As noted above, it is desired to recover the frequency at which the original circuit operated—links 802 and 804 each operate at some frequency. This process is known at clock recovery. When the link 808 is subsequently de-multiplexed at 810, both the information in the links 802, 804 and the frequency of the links 802, 804 should be recoverable, so that the links 802, 804 can be accurately recreated as 812, 814, in terms of both the values of individual bits and the spacing there-between. If frequency spreading in accordance with embodiments of the invention were not employed, the delay issues shown in FIGS. 3 and 4 would cause difficulty in attempting desired clock recovery in block 810 (for example, using a phase-locked loop (PLL)).

Figure 9:
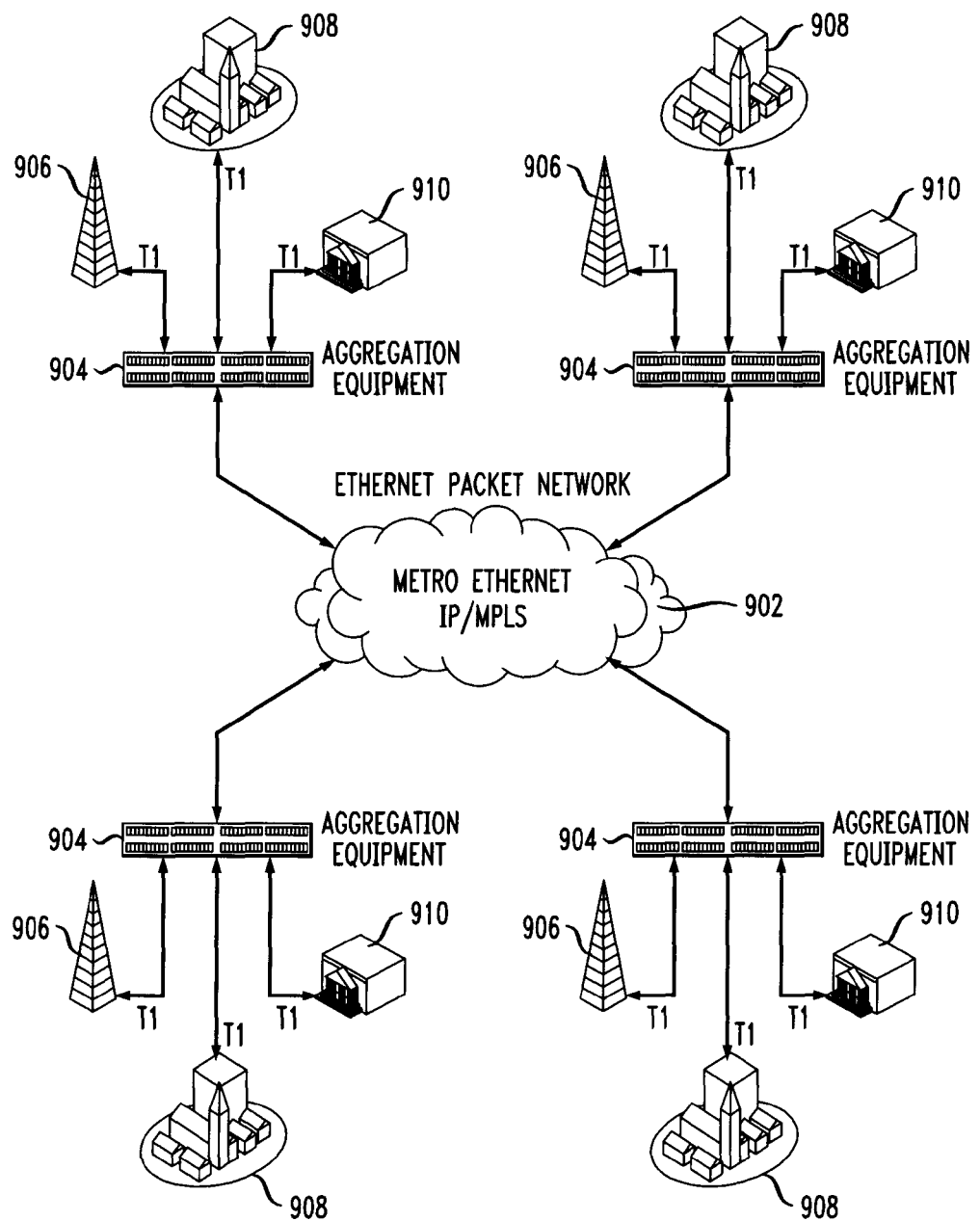
FIG. 9 depicts a second non-limiting exemplary telecommunications network, in which one or more techniques of the invention may be employed.

FIG. 9 depicts another non-limiting exemplary telecommunications network, in which one or more techniques of the invention may be employed. A plurality of asynchronously clocked low bandwidth telecommunication circuits (for example, T1 circuits from a cellular station 906, city 908, or central station 910) are input into aggregation equipment 904 (which uses frequency spreading techniques as described elsewhere herein) and which aggregates the T1 lines into higher bandwidth Ethernet packet network 902 (or a similar network). As noted above, when present in aggregation equipment (such as equipment 904 in FIG. 9) on the edge of the network (for example, network 902 in FIG. 9), one or more embodiments of a spread-spectrum scheduler (for example, as shown in FIG. 6 and using spread spectrum scheduler 610), according to aspects of the invention, are able to provide a frequency window such as 552, 554 for the transmission of asynchronously timed packets or cells, which reduces the probability that repeated, long lasting congestion between two links will occur.

Various examples have been given in terms of links, but the principles therein may also be employed with respect to interfaces. For example, in the embodiment of FIG. 6, scheduling with the benefit of spread spectrum scheduler 610 could be carried out in an interface environment (scheduling for sending) as well as in a link environment (scheduling for transmission).

Figure 12:
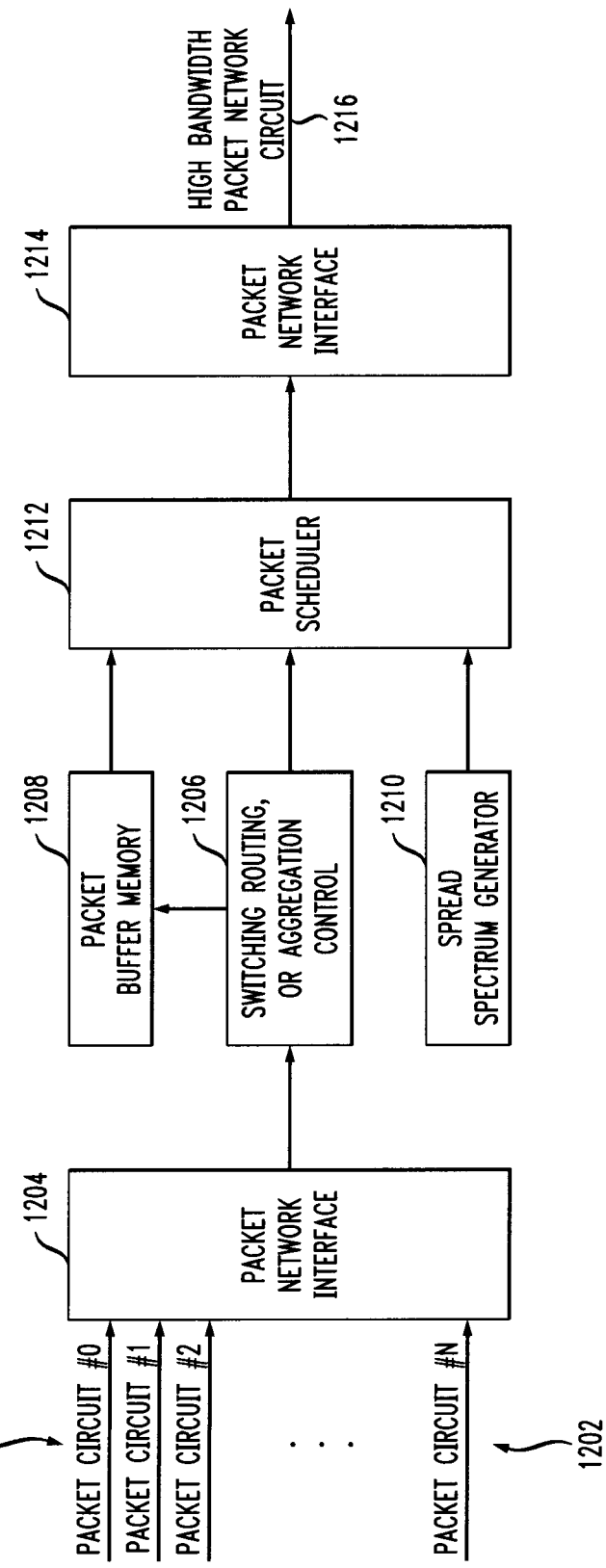
FIG. 12 is another exemplary telecommunications aggregation (multiplexing) device block diagram, according to a still further aspect of the invention.

FIG. 12 is generally similar to FIG. 6, except that it depicts an alternative embodiment of the invention wherein packet scheduling, but not packet construction, is carried out. Elements analogous to those in FIG. 6 have received the same reference character incremented by six hundred. In this embodiment, packets are being brought in, aggregated together, scheduled, and then sent out again. The packet streams have already been constructed somewhere else; for example, in another device, or one integrated circuit chip could perform construction and communicate with another integrated circuit chip on the same board carrying out the functionality depicted in FIG. 12 (that is, scheduling, routing, and the like to address the beat frequency issue).

In FIG. 12, at least two asynchronously clocked packet based telecommunications circuits 1202, numbered 0 through N, are input to a packet network interface 1204. Switching, routing, or aggregation control is carried out in block 1206. The packets are then loaded into packet buffer memory 1208. Transmission of the packets is scheduled by packet scheduler 1212, and is carried out by packet network interface 1214, resulting in aggregation of (packet-based) links 1202 into high bandwidth packet network circuit 1216. Packet scheduler 1212 receives input from spread spectrum generator block 1210, to probabilistically spread the transmission of packets within windows such as 552, 554 in FIG. 5. One non-limiting exemplary implementation of spread spectrum generator 1210 is a pseudo random number generator with a calculable balance point. A pseudo-random bit sequence (PRBS) is generated to obtain a repeating bit pattern of finite length. The PRBS is evenly distributed and is tapped such that ½ of the numbers yield early transmission of the packet relative to nominal points 556, 558 and ½ of the numbers yield late transmission relative to nominal points 556, 558. Generator 1210 may be implemented entirely in hardware (e.g., as an ASIC or a portion thereof) or in software or firmware embodied in a tangible computer-readable recordable storage medium running on hardware such as a general purpose processor.

It should be noted, for the avoidance of doubt, that the links to be aggregated could be packetized as in FIG. 12 or not packetized as in FIG. 6. In the latter case, packets are constructed as well as being scheduled, while in the former, only packet scheduling is required. Furthermore, as noted above, the lower bandwidth links can be aggregated into a higher bandwidth link, in which case packets are transmitted, or a higher bandwidth interface, in which packets are sent to the interface. In a case when the lower bandwidth links are packetized, the packets are received, scheduled, and then transmitted in the case of a link or sent to the interface in the case of an interface. In a case when the lower bandwidth links are not packetized, the data is received, packets are created, packets are scheduled, and then transmitted in the case of a link or sent to the interface in the case of an interface.

Given the description thus far, it will be appreciated that, in general terms, an apparatus, according to an embodiment of the invention, includes a spread spectrum generator module 610 configured to provide data for spreading frequency spectra of at least first and second lower bandwidth asynchronously clocked communication links (for example, links 102, 104; links 602; links 802, 804, or links 1202). The links may be packetized. The apparatus also includes a packet scheduling module. In many embodiments, including the non-limiting example of FIG. 6, the packet scheduling module is a packet construction and scheduling module (for example, formed by blocks 606, 608, and 612). In other embodiments, such as FIG. 12, there are packets on both sides and the packets are simply being scheduled with a scheduling module (which might include, for example, 1206, 1208, and 1212). The packet scheduling module is configured to aggregate the two (or more) lower bandwidth links into a higher bandwidth link or interface. The frequency spectra of the lower bandwidth links are spread in accordance with the data for spreading the frequency spectra.

In one or more embodiments, the spread spectrum generator module and the packet scheduling module are cooperatively configured to spread the frequency spectrum of the lower bandwidth links by determining a series of nominal times (for example, as shown by "flagpoles" 556, 558 in FIG. 5) for packet transmission or sending, and actually carrying out packet transmission or sending within probabilistic windows (for example, windows 552, 554 in FIG. 5) centered about the nominal times. This process can, in turn, involve determining scheduled times for transmission or sending of the packets of the lower bandwidth links by calculating offsets of scheduled times from the nominal times, by tapping a pseudo random bit sequence (PRBS) as described above. The same or different PRBSs can be used for each link. One or more true random bit sequences could also be employed. The scheduled times include the leading edges of the packets as shown in FIG. 5. For example, the offset for transmission of packet $0_0$ at the top of FIG. 5 is 16 ticks early, while that for transmission of packet $0_1$ is 12 ticks late.

In some instances, the apparatus includes a disaggregation element, such as element 810 in FIG. 8, coupled to the higher bandwidth link or interface. The disaggregation element (which could include, for example, a PLL) filters high frequency noise resulting from the spreading of the spectra, when disaggregating the higher bandwidth link or interface to recover the two (or more) lower bandwidth links. As used herein, high frequency noise includes the noise from intentionally spreading the spectra as shown in FIG. 5. The disaggregation element 810 can be located in the network downstream of the multiplexer 806, as seen in FIG. 8.

Figure 10:
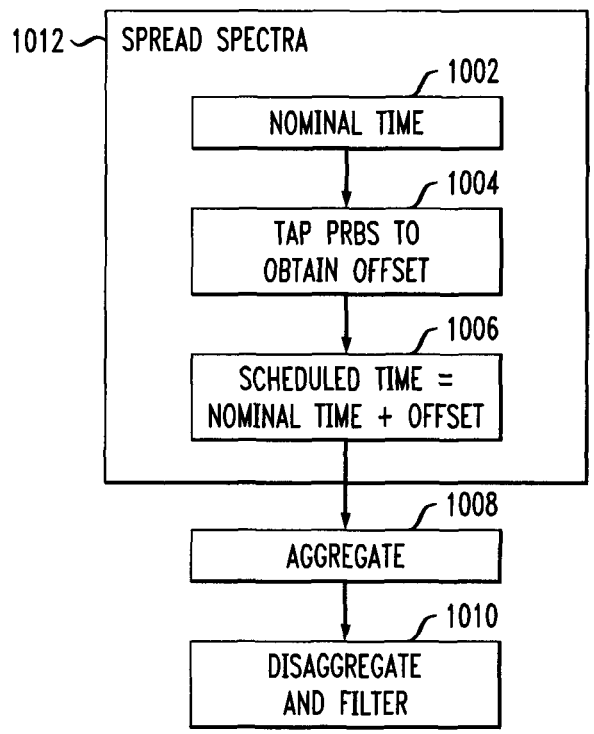
FIG. 10 presents a flow chart of exemplary method steps, according to an even further aspect of the invention.

Referring now to FIG. 10, an exemplary method, according to an aspect of the invention, includes spreading frequency spectra of two (or more) lower bandwidth asynchronously clocked communication links (which may be packetized), as at 1012. The method also includes subsequently aggregating (also referred to herein as multiplexing) the two (or more) lower bandwidth asynchronously clocked communication links into one a higher bandwidth link or interface, using multiplexing equipment, as at 1008. Note that lower and higher bandwidth, as used herein, including the terms, are relative terms; the lower bandwidth links simply have less bandwidth than the higher bandwidth link or interface.

In one or more instances, a further step 1010 includes filtering high frequency noise, resulting from the spreading of the spectra, when disaggregating the higher bandwidth link or interface to recover the two (or more) lower bandwidth links. Disaggregating is also referred to herein as de-aggregating or de-multiplexing.

In one or more embodiments, spreading step 1012 includes determining a series of nominal times for transmission or sending of packets for the low bandwidth links, as at 1002, and actually carrying out transmission or sending of the packets within probabilistic windows centered about the nominal times, as discussed elsewhere herein. As noted, one way to do this is determine scheduled times for transmission or sending of the packets of the lower bandwidth links by calculating offsets of the first link scheduled times from the first link nominal times, by tapping a first pseudo (or true) random bit sequence, as at 1004. The scheduled transmission time is then the nominal time plus the offset, as at 1006.

System and Article of Manufacture Details

Figure 11:
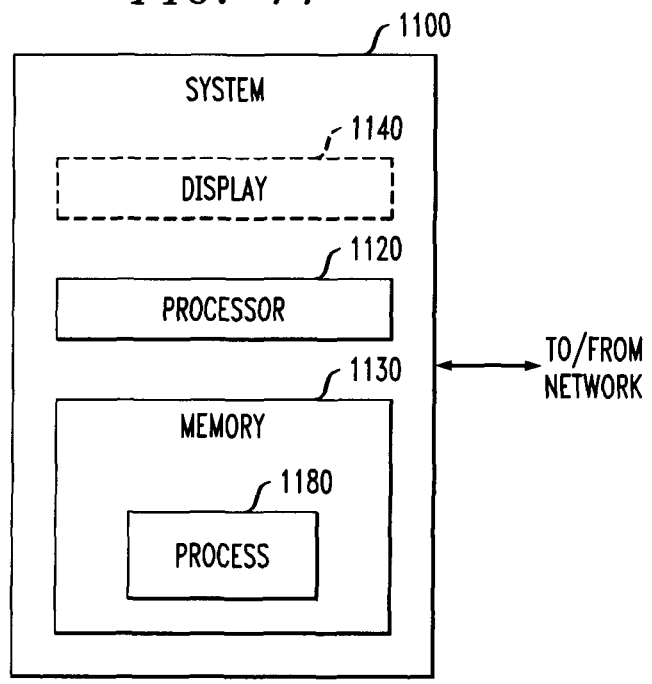
FIG. 11 depicts an exemplary data processing system, including a processor and memory, which can be employed to implement at least a portion of some embodiments of the invention.

Embodiments of the invention may be carried out in software or firmware running on one or more general purpose processors, in special purpose hardware, or a combination of both. Software includes but is not limited to firmware, resident software, microcode, etc. FIG. 11 is a block diagram of a system 1100 that can implement part or all of one or more aspects or processes of the invention. As shown in FIG. 11, memory 1130 configures the processor 1120 to implement one or more aspects of the methods, steps, and functions disclosed herein (collectively, shown as process 1180 in FIG. 11). Different method steps can be performed by different processors. The memory 1130 could be distributed or local and the processor 1120 could be distributed or singular. The memory 1130 could be implemented as an electrical, magnetic or optical memory, or any combination of these or other types of storage devices. It should be noted that if distributed processors are employed, each distributed processor that makes up processor 1120 generally contains its own addressable memory space. It should also be noted that some or all of computer system 1100 can be incorporated into an application-specific or general-use integrated circuit. For example, one or more method steps could be implemented in hardware in an ASIC rather than using firmware. Display 1140 is representative of a variety of possible input/output devices. Display 1140 (and other elements besides the processor 1120 and memory 1130) may not be present in all cases.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a storage medium (e.g., floppy disks, hard drives, compact disks, EEPROMs, or memory cards) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on magnetic media or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention, such as, for example, spread spectrum generator 610, can make use of computer technology with appropriate instructions to implement method steps described herein.

Accordingly, it will be appreciated that one or more embodiments of the present invention can include a computer program comprising computer program code means adapted to perform one or all of the steps of any methods or claims set forth herein when such program is run on a hardware processor, and that such program may be embodied on a computer readable medium. Further, one or more embodiments of the present invention can include a computer comprising code adapted to cause the hardware processor to carry out one or more steps of methods or claims set forth herein, together with one or more apparatus elements or features as depicted and described herein.

Furthermore, it should be noted that any of the methods described herein can include an additional step of providing a system comprising distinct software modules embodied on a tangible computer readable recordable storage medium. All the modules (or any subset thereof) can be on the same medium, or each can be on a different medium, for example. The modules can include appropriate components shown in the figures. The method steps can then be carried out using the distinct software modules of the system, as described above, executing on one or more hardware processors. Further, a computer program product can include a tangible computer-readable storage medium with code adapted to be executed to carry out one or more method steps described herein, including the provision of the system with the distinct software modules.

At least a portion of the techniques of the invention, for aggregating lower bandwidth asynchronously clocked packetized communication links into a higher bandwidth link, may be implemented in one or more integrated circuits. In forming integrated circuits, a number of identical dies are typically fabricated in a repeated pattern on a surface of a semiconductor wafer. Each die includes a device described herein, and may include other structures or circuits. The individual dies are cut or diced from the wafer, then packaged as an integrated circuit. One skilled in the art would know how to dice wafers and package dies to produce integrated circuits. Integrated circuits so manufactured are considered part of this invention.

Although illustrative embodiments of the invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method comprising the steps of:
spreading a first frequency spectrum of at least a first lower bandwidth asynchronously clocked communication link such that high frequency noise is injected into said first frequency spectrum that can be filtered by a receiver, wherein said first frequency spectrum is a frequency of packets to be transmitted on said first lower bandwidth asynchronously clocked communication link;
spreading a second frequency spectrum of at least a second lower bandwidth asynchronously clocked communication link such that high frequency noise is injected into said second frequency spectrum that can be filtered by a receiver, wherein said second frequency spectrum is a frequency of packets to be transmitted on said second lower bandwidth asynchronously clocked communication link; and
subsequent to said steps of spreading said first and second frequency spectra of said at least first and second lower bandwidth asynchronously clocked communication links, aggregating said at least first and second lower bandwidth asynchronously clocked communication links into one of a higher bandwidth link and a higher bandwidth interface, using multiplexing equipment, wherein said aggregating step further comprises the step of scheduling a transmission of said packets from said first and second lower bandwidth asynchronously clocked communication links to avoid collisions on said higher bandwidth link, wherein said scheduling is based on said injected high frequency noise.

2. The method of claim 1, further comprising filtering high frequency noise, resulting from said spreading of said first and second frequency spectra, when disaggregating said one of a higher bandwidth link and a higher bandwidth interface to recover said at least first and second lower bandwidth asynchronously clocked communication links.

3. The method of claim 2, wherein:
said spreading of said first frequency spectrum of said first lower bandwidth asynchronously clocked communication link comprises:
determining a series of first link nominal times for one of transmission and sending to an interface of packets of said first lower bandwidth asynchronously clocked communication link; and
actually carrying out said one of transmission and sending to said interface of said packets of said first lower bandwidth asynchronously clocked communication link within probabilistic windows centered about said first link nominal times; and
said spreading of said second frequency spectrum of said second lower bandwidth asynchronously clocked communication link comprises:
determining a series of second link nominal times for one of transmission and sending to said interface of packets of said second lower bandwidth asynchronously clocked communication link; and
actually carrying out said one of transmission and sending to said interface of said packets of said second lower bandwidth asynchronously clocked communication link within probabilistic windows centered about said second link nominal times.

4. The method of claim 3, wherein:
said actual carrying out said one of transmission and sending to said interface of said packets of said first lower bandwidth asynchronously clocked communication link within said probabilistic windows centered about said first link nominal times comprises determining first link scheduled times for said one of transmission and sending to said interface of said packets of said first lower bandwidth asynchronously clocked communication link by calculating offsets of said first link scheduled times from said first link nominal times, by tapping one of a first pseudo random bit sequence and a first true random bit sequence; and
said actual carrying out said one of transmission and sending to said interface of said packets of said second lower bandwidth asynchronously clocked communication link within said probabilistic windows centered about said second link nominal times comprises determining second link scheduled times for said one of transmission and sending to said interface of said packets of said second lower bandwidth asynchronously clocked communication link by calculating offsets of said second link scheduled times from said second link nominal times, by tapping one of a second pseudo random bit sequence and a second true random bit sequence.

5. The method of claim 3, wherein said filtering of said resultant high frequency noise when disaggregating said one of a higher bandwidth link and a higher bandwidth interface to recover said at least first and second lower bandwidth asynchronously clocked communication links comprises employing a phase locked loop to carry out clock recovery.

6. The method of claim 5, wherein said disaggregating comprises said disaggregating of said higher bandwidth link at a downstream network location.

7. The method of claim 3, wherein said at least first and second lower bandwidth asynchronously clocked communication links comprise packetized links.

8. The method of claim 2, wherein said first and second lower bandwidth asynchronously clocked communication links comprise non-packetized links, further comprising creating said packets of said first and second lower bandwidth asynchronously clocked communication links.

9. An apparatus comprising:
a spread spectrum generator module configured to provide data for spreading first and second frequency spectra of at least first and second lower bandwidth asynchronously clocked communication links such that high frequency noise is injected into said first and second frequency spectra that can be filtered by a receiver, wherein each of said first and second frequency spectra are frequencies of packets to be transmitted on said first and second lower bandwidth asynchronously clocked communication links, respectively, and wherein said spread spectrum generator module comprises one or more hardware devices; and a packet scheduling module configured to aggregate said at least first and second lower bandwidth asynchronously clocked communication links into one of a higher bandwidth link and a higher bandwidth interface, with said first and second frequency spectra of said at least first and second lower bandwidth asynchronously clocked communication links spread in accordance with said data for spreading said first and second frequency spectra, wherein said packet scheduling module comprises one or more hardware devices, wherein said packet scheduling module is further configured to schedule a transmission of said packets from said first and second lower bandwidth asynchronously clocked communication links to avoid collisions on said higher bandwidth link, wherein said scheduling is based on said injected high frequency noise.

10. The apparatus of claim 9, wherein:
said spread spectrum generator module and said packet scheduling module are cooperatively configured to spread said first frequency spectrum of said first lower bandwidth asynchronously clocked communication link by:
  determining a series of first link nominal times for one of transmission and sending to an interface of packets of said first lower bandwidth asynchronously clocked communication link; and
  actually carrying out said one of transmission and sending to said interface of said packets of said first lower bandwidth asynchronously clocked communication link within probabilistic windows centered about said first link nominal times; and
said spread spectrum generator module and said packet and scheduling module are cooperatively configured to spread said second frequency spectrum of said second lower bandwidth asynchronously clocked communication link by:
  determining a series of second link nominal times for one of transmission and sending to said interface of packets of said second lower bandwidth asynchronously clocked communication link; and
  actually carrying out said one of transmission and sending to said interface of said packets of said second lower bandwidth asynchronously clocked communication link within probabilistic windows centered about said second link nominal times.

11. The apparatus of claim 10, wherein:
said spread spectrum generator module and said packet scheduling module are cooperatively configured to actually carry out said one of transmission and sending to said interface of said packets of said first lower bandwidth asynchronously clocked communication link within said probabilistic windows centered about said first link nominal times by determining first link scheduled times for said one of transmission and sending to said interface of said packets of said first lower bandwidth asynchronously clocked communication link by calculating offsets of said first link scheduled times from said first link nominal times, by tapping one of a first pseudo random bit sequence and a first true random bit sequence;

said spread spectrum generator module and said packet scheduling module are cooperatively configured to actually carry out said one of transmission and sending to said interface of said packets of said second lower bandwidth asynchronously clocked communication link within said probabilistic windows centered about said second link nominal times by determining second link scheduled times for said one of transmission and sending to said interface of said packets of said second lower bandwidth asynchronously clocked communication link by calculating offsets of said second link scheduled times from said second link nominal times, by tapping one of a second pseudo random bit sequence and a second true random bit sequence; and said data for spreading said first and second frequency spectra of said at least first and second lower bandwidth asynchronously clocked communication links comprises said offsets of said first link scheduled times from said first link nominal times and said offsets of said second link scheduled times from said second link nominal times.

12. The apparatus of claim 11, wherein said at least first and second lower bandwidth asynchronously clocked communication links comprise packetized links.

13. The apparatus of claim 11, wherein said first and second lower bandwidth asynchronously clocked communication links comprise non-packetized links, and wherein said packet scheduling module comprises a packet scheduling and creation module configured to create said packets of said first and second lower bandwidth asynchronously clocked communication links.

14. The apparatus of claim 9, further comprising a disaggregation element coupled to said one of a higher bandwidth link and a higher bandwidth interface, said disaggregation element filtering high frequency noise, resulting from said spreading of said first and second frequency spectra, when disaggregating said one of a higher bandwidth link and a higher bandwidth interface to recover said at least first and second lower bandwidth asynchronously clocked communication links.

15. The apparatus of claim 14, wherein said disaggregation element comprises a phase locked loop configured to carry out clock recovery and filter said resultant high frequency noise when disaggregating said one of a higher bandwidth link and a higher bandwidth interface to recover said at least first and second lower bandwidth asynchronously clocked communication links.

16. The apparatus of claim 14, wherein said packet scheduling module is configured to aggregate said at least first and second lower bandwidth asynchronously clocked communication links into said higher bandwidth link, and wherein said disaggregation element is located at a downstream network location.

17. An integrated circuit including at least one apparatus, said at least one apparatus comprising:
a spread spectrum generator module configured to provide data for spreading first and second frequency spectra of at least first and second lower bandwidth asynchronously clocked communication links, respectively, such that high frequency noise is injected into said first and second frequency spectra that can be filtered by a receiver, wherein said spread spectrum generator module comprises one or more hardware devices; and a packet scheduling module configured to aggregate said at least first and second lower bandwidth asynchronously clocked communication links into one of a higher bandwidth link and a higher bandwidth interface, with said first and second frequency spectra of said at least first and second lower bandwidth asynchronously clocked communication links spread in accordance with said data for spreading said first and second frequency spectra, wherein said packet scheduling module comprises one or more hardware devices, wherein said packet scheduling module is further configured to schedule a transmission of said packets from said first and second lower bandwidth asynchronously clocked communication links to avoid collisions on said higher bandwidth link, wherein said scheduling is based on said injected high frequency noise.

18. The integrated circuit of claim 17, wherein:

said spread spectrum generator module and said packet scheduling module are cooperatively configured to spread said first frequency spectrum of said first lower bandwidth asynchronously clocked communication link by:
  determining a series of first link nominal times for one of transmission and sending to an interface of packets of said first lower bandwidth asynchronously clocked communication link; and
  actually carrying out said one of transmission and sending to said interface of said packets of said first lower bandwidth asynchronously clocked communication link within probabilistic windows centered about said first link nominal times; and said spread spectrum generator module and said packet scheduling module are cooperatively configured to spread said second frequency spectrum of said second lower bandwidth asynchronously clocked communication link by:
  determining a series of second link nominal times for one of transmission and sending to said interface of packets of said second lower bandwidth asynchronously clocked communication link; and
  actually carrying out said one of transmission and sending to said interface of said packets of said second lower bandwidth asynchronously clocked communication link within probabilistic windows centered about said second link nominal times.

19. The integrated circuit of claim 18, wherein:

said spread spectrum generator module and said packet scheduling module are cooperatively configured to actually carry out said one of transmission and sending to said interface of said packets of said first lower bandwidth asynchronously clocked communication link within said probabilistic windows centered about said first link nominal times by determining first link scheduled times for said one of transmission and sending to said interface of said packets of said first lower bandwidth asynchronously clocked communication link by calculating offsets of said first link scheduled times from said first link nominal times, by tapping one of a first pseudo random bit sequence and a first true random bit sequence;

said spread spectrum generator module and said packet scheduling module are cooperatively configured to actually carry out said one of transmission and sending to said interface of said packets of said second lower bandwidth asynchronously clocked communication link within said probabilistic windows centered about said second link nominal times by determining second link scheduled times for said one of transmission and sending to said interface of said packets of said second lower bandwidth asynchronously clocked communication link by calculating offsets of said second link scheduled times from said second link nominal times, by tapping one of a second pseudo random bit sequence and a second true random bit sequence; and said data for spreading said first and second frequency spectra of said at least first and second lower bandwidth asynchronously clocked communication links comprises said offsets of said first link scheduled times from said first link nominal times and said offsets of said second link scheduled times from said second link nominal times.

20. The integrated of claim 17, wherein said first and second lower bandwidth asynchronously clocked communication links comprise non-packetized links, and wherein said packet scheduling module comprises a packet scheduling and creation module configured to create said packets of said first and second lower bandwidth asynchronously clocked communication links.

* * * * *